United States Patent [19]

Van Allen

[11] Patent Number: 5,676,867

[45] Date of Patent: Oct. 14, 1997

[54] APPARATUS AND METHOD FOR MONITORING AND EVALUATING WELD QUALITY

[75] Inventor: Kent Van Allen, Washington, Mich.

[73] Assignee: Emhart Inc., Newark, Del.

[21] Appl. No.: 579,770

[22] Filed: Dec. 28, 1995

[51] Int. Cl.$^6$ .................................................. B23K 9/20
[52] U.S. Cl. ........................... 219/130.01; 219/98; 219/99
[58] Field of Search ........................... 219/130.01, 130.21, 219/137 PS, 98, 99

[56] References Cited

U.S. PATENT DOCUMENTS

| | | |
|---|---|---|
| 4,456,808 | 6/1984 | Wilkinson et al. |
| 4,804,811 | 2/1989 | Raycher et al. ........................ 219/98 |
| 5,313,045 | 5/1994 | Baavhammar ........................ 219/137 PS |

FOREIGN PATENT DOCUMENTS 0 117 925   9/1984   European Pat. Off.

OTHER PUBLICATIONS

Morgan–Warren, "The Control of Arc Stud Welding", Advances in Welding Processes 3rd International Conference, vol. 1, May 1974, pp. 1–7.

*Primary Examiner*—Clifford C. Shaw
*Attorney, Agent, or Firm*—Harness, Dickey & Pierce, P.L.C.

[57] ABSTRACT

A weld monitoring and evaluating circuit (10) for non-destructively determining if a just-completed weld is a satisfactory or an unsatisfactory weld. The circuit is used to derive the temperature at the weld zone in real time by determining the total power input to the weld zone, taking into account losses experienced at the weld zone, and dividing the result by the thermal mass of the weld zone. The predicted temperature at the weld zone is compared against an electrical signal representing at least a minimum desired welding temperature needed to be attained at the weld zone to produce a satisfactory weld at the time that the stud (16) contacts the weld pool (18a) (e.g., the "plunge event"). If the derived weld temperature signal has exceeded the reference signal at the time the plunge event occurs, then it is assumed that a satisfactory weld has occurred. If the electrical signal representing the derived weld temperature does not exceed the reference signal at the time the plunge event occurs, then it is assumed that an unsatisfactory weld has occurred. In an alternative preferred embodiment, a comparator window circuit (138) is used to ensure that the derived weld temperature at the time of the plunge event falls between predetermined upper and lower temperature limits before a satisfactory weld is indicated. A further embodiment uses the derived weld temperature signal to dynamically control the drop point of the stud and thereby control the total weld time. Weld repeatability and quality are thereby improved.

25 Claims, 4 Drawing Sheets

APPARATUS AND METHOD FOR MONITORING AND EVALUATING WELD QUALITY

BACKGROUND OF THE INVENTION

1. Technical Field

This invention relates to stud welding equipment, and particularly to the field of evaluating the quality of a welding connection between a stud and a supporting metallic member.

2. Discussion

In the manufacture of automobiles and other durable goods such as appliances, there is often a need for threaded studs or other stud-like members to be welded to structural elements such as body panels or support panels, with the studs or other like members then serving as attachment points for other components, clips, cable holders, electrical connectors, etc. To preserve the integrity of the function which the stud must perform, it is of critical importance that the stud be properly attached to the panel. Unfortunately, oil or other contaminants which may be present on the surface of the material in the weld zone may interfere with the welding operation. Additionally, errors in the welding or handling machinery may also cause defects. In the context of modern high-speed manufacturing lines, it is at present very difficult to accurately detect in a non-destructive manner the quality of welds as they occur. By "non-destructively" it is meant detecting whether a weld is satisfactory or not without physically altering or destroying the weld.

If faulty welds are not detected immediately, parts bearing defective welds may continue to proceed along an assembly process. This causes, at a minimum, quality problems and/or subsequent repair problems, all of which add to product cost. Accordingly, it is highly desirable to determine if a weld is satisfactory or defective when the weld operation is performed. It is further highly desirable to make this determination without altering or stressing the weld attachment point unnecessarily, which might damage an otherwise satisfactory weld.

Prior art methods of evaluating weld quality have involved techniques such as monitoring the voltage or current of the welding arc produced by the welding machine. Such techniques are frequently unsatisfactory because variations in the monitored parameters may arise from causes not directly related to weld quality. Other techniques utilizing electronic circuits have been designed which measure a large variety of weld parameters. Such techniques may involve monitoring simultaneously the current, voltage, impedance, weld time, and plunge time, as well as integrating the current and voltage. Such systems have traditionally been expensive and somewhat unreliable.

Another drawback with present weld quality monitoring equipment is the susceptibility to electrical noise, which can cause the weld monitoring equipment to give an erroneous indication that a weld is bad, when the weld is in fact acceptable. This is particularly true for digital weld monitoring equipment which, in general, is much more likely to be influenced by electrical noise during the actual welding process. It is believed that such digital weld monitoring equipment routinely identifies a significant number of good welds as being unacceptable, and that possibly up to 50% of the welds indicated as being unacceptable by conventional equipment of this type are in fact acceptable in quality.

Accordingly, there is a need for a simplified system which can more accurately reflect, in real time, the actual process taking place in the weld zone, and thus provide an accurate indication of whether or not a weld is satisfactory. There is also a need for a simplified method and apparatus for monitoring the process taking place in the weld zone and for using the results of such monitoring to dynamically control the initiation of stud movement toward the weld pool so as to more reliably assure the achievement of a satisfactory weld.

SUMMARY OF THE INVENTION

The above and other needs are met by an apparatus and method for monitoring and evaluating weld quality in accordance with preferred embodiments of the present invention. In particular, the present invention discloses a stud welding controller that is adapted to monitor the temperature of the weld during the welding process. By comparing this temperature value at the moment the stud touches the weld pool with a reference value, an immediate indication of weld quality can be obtained.

The apparatus of the present invention comprises a weld monitoring circuit which develops a signal corresponding to the total power supplied to the weld zone by the welding power supply. This signal is supplied to an amplifier circuit which simulates the thermal characteristics of the weld setup such that the output signal from the amplifier circuit is representative of the temperature of the weld zone. More specifically, the amplifier includes a feedback circuit that simulates the effective thermal mass of the specific weld setup and the rate at which heat is dissipated from the weld zone.

The quality of the weld is evaluated by a temperature comparator circuit for comparing the derived temperature signal with a reference temperature signal, wherein the reference temperature signal is an electrical signal representative of a minimum weld zone temperature which must be attained during the welding process to ensure a satisfactory weld. To identify the point in time when the stud contacts the weld pool ("plunge event"), a second comparator circuit is included for monitoring a real time electrical signal representing the arc voltage and determining when this arc voltage has dropped essentially to zero. When the electrical signal representing the arc voltage drops below a reference signal, a "plunge" signal is generated indicating that the stud has contacted the weld pool, and the current "temperature" signal is captured. This temperature value can then be recorded and used for statistical quality control of the weld process.

In this manner, the apparatus of the present invention can determine, virtually in real time, whether a just-completed weld is satisfactory or unsatisfactory. This determination is further made non-destructively so as to not to negatively affect otherwise satisfactory welds.

It is therefore a principal object of the present invention to accurately evaluate the quality of a weld by monitoring the temperature at the weld zone during the welding process based on the total power supplied to the weld. More specifically, by first empirically determining a minimum acceptable welding temperature that must be attained during the welding process for a given weld setup, and then monitoring the total power applied by the welding power supply (factoring in losses) and generating an electrical signal representative of the instantaneous welding temperature at the weld zone, and comparing the attained weld temperature at the plunge event with the minimum welding temperature, reliable determinations of weld quality can be quickly and easily made. The preferred embodiment of the present invention provides the further advantage of being much less susceptible to noise generated during the welding process which could otherwise affect the accuracy of the weld controller.

In an alternative preferred embodiment, the apparatus includes a comparator "window" circuit for comparing the welding temperature signal to upper and lower predetermined electrical reference signals indicative of maximum and minimum welding temperatures, respectively. A preliminary output signal indicating a satisfactory weld is only generated if the weld temperature signal at the plunge event falls between the upper and lower reference limits.

In a further alternative embodiment of the present invention, the weld temperature signal is used to dynamically control the "drop point"—the point when the stud is released by the stud lifter—in the welding process. In particular, for those weld setups where the ideal weld time is substantially longer than the drop time of the stud, the ideal weld temperature at the point in the weld cycle equal to the ideal weld time minus the drop time can be empirically determined. This ideal weld temperature thus equates to a desired "drop point temperature". The actual weld temperature signal can therefore be compared to a reference signal representative of the desired drop point temperature, and the result of the comparison used to dynamically control the release of the stud by the stud lifter. In this manner, the total weld time is automatically adjusted as conditions in the weld process change.

BRIEF DESCRIPTION OF THE DRAWINGS

The various advantages of the present invention will become apparent to one skilled in the art by reading the following specification and subjoined claims and by referencing the following drawings in which:

FIG. 3 is a schematic diagram of an alternative preferred embodiment of the weld monitoring circuit of the present invention;

FIG. 6 is a schematic diagram of a second alternative embodiment of the weld monitoring circuit of the present invention.

DETAILED DESCRIPTION OF THE PREFERRED EMBODIMENTS

Figures 1, 2:
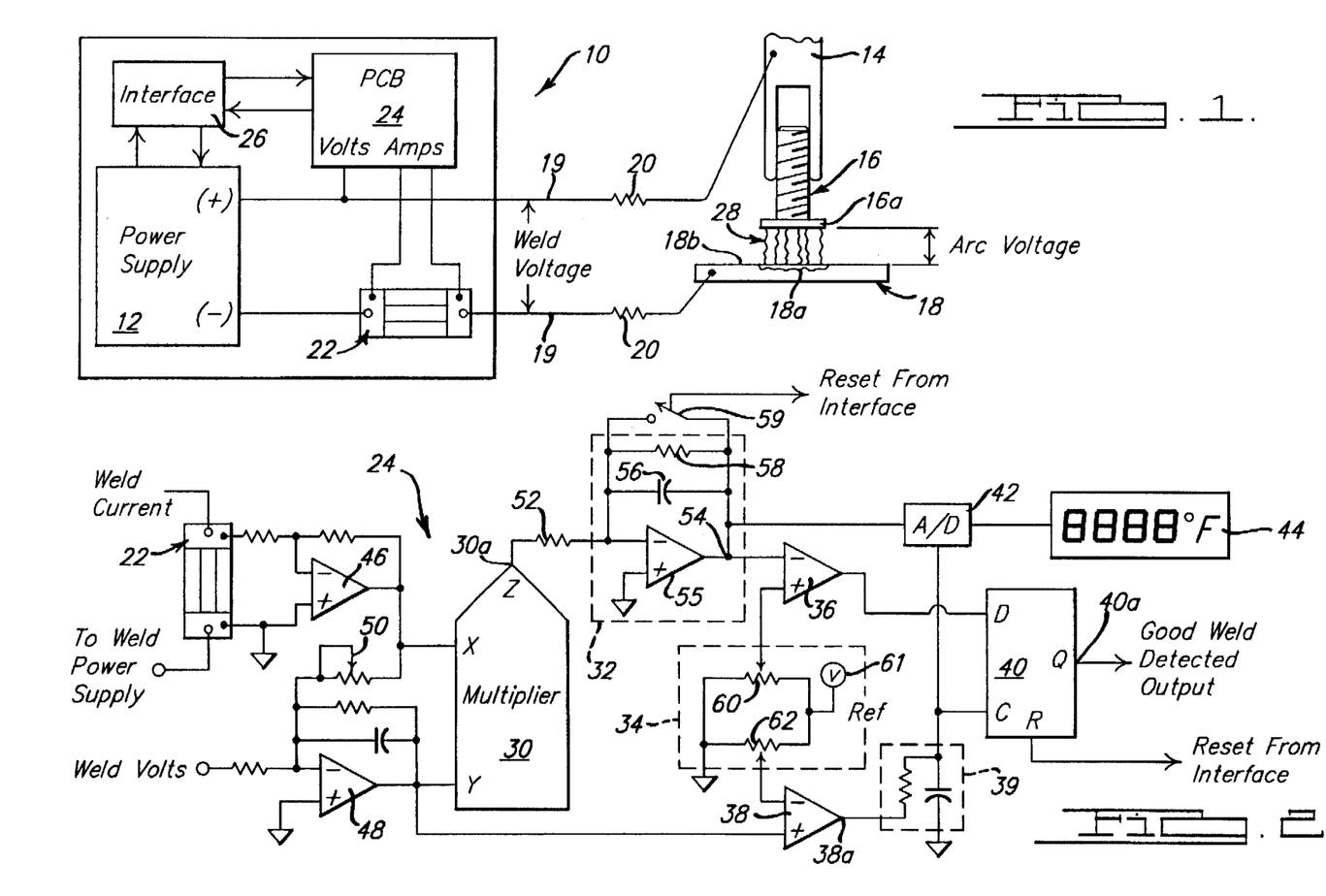
FIG. 1 is a simplified diagram of a welding circuit incorporating the weld monitoring circuit of the present invention.
FIG. 2 is a schematic diagram of a preferred embodiment of the weld monitoring circuit of the present invention.
Figure 2:
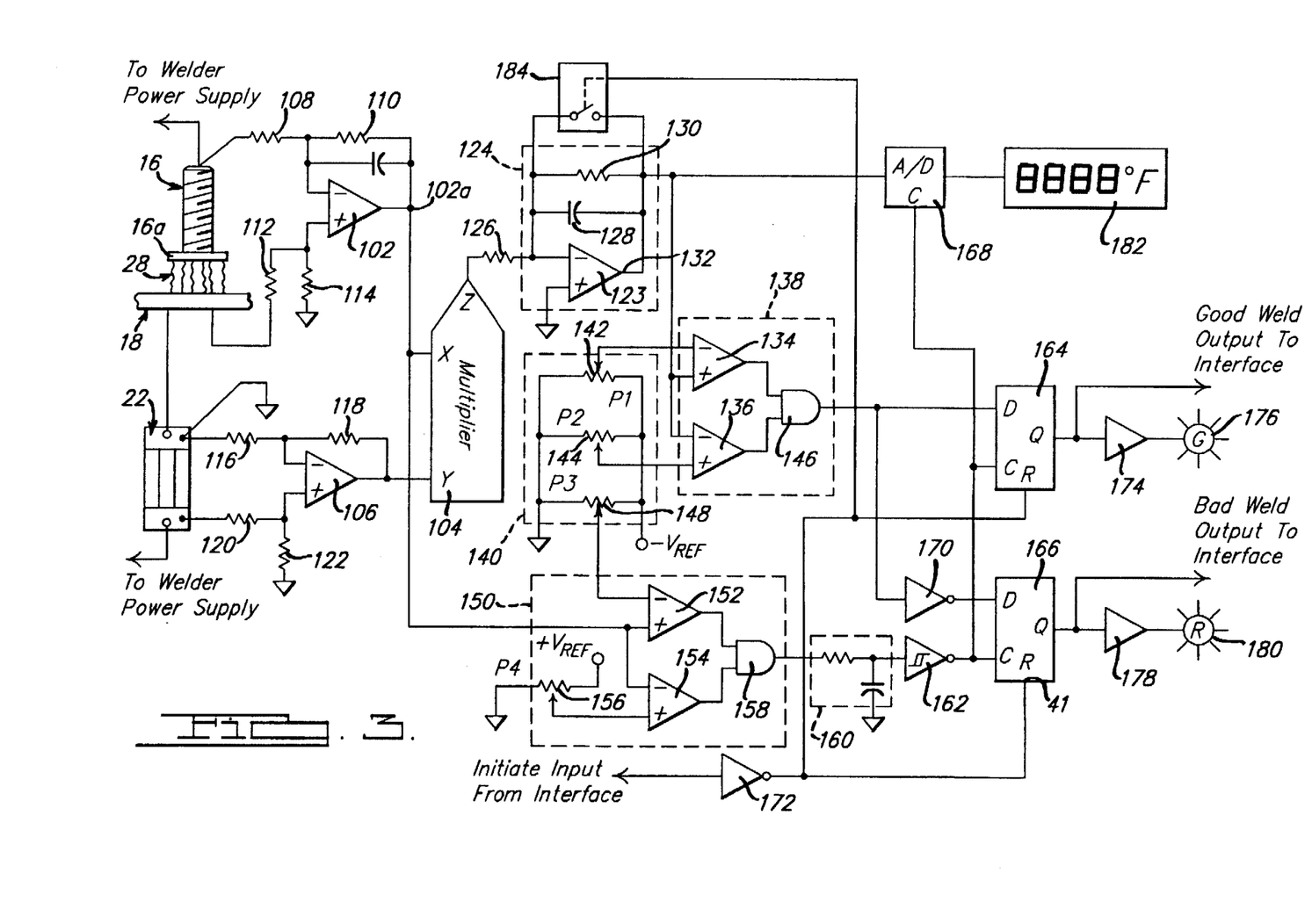

Referring to FIG. 1, there is shown a typical stud welding circuit 10. The welding circuit 10 generally includes a welding power supply 12 for supplying a welding current to a stud lifter 14, through a stud 16, to the metallic surface 18 to which the stud 16 is being welded. Internal line resistances of welding cables 19 are represented by resistors 20. The welding current passes through a current sensing resistor 22 which provides a weld current signal to the controller 24. The control circuit 24 receives power from the power supply 12 and controls the on/off operation of the power supply 12 via an interface circuit 26. The welding power supply 12 is capable of generating a welding current of up to approximately 3,000 amps, which creates an arc voltage 28 when a head 16a of the stud 16 is lifted from the metallic surface 18. The stud lifter 14 is controlled in a conventional fashion, preferably by a solenoid which initially lifts the stud 16 away from the metallic surface 18 at the start of the welding process, holds the stud 16 in the elevated position shown in FIG. 1, so that when released, a "weld pool" 18a will have formed on the metallic surface 18 when the stud 16 reaches the metallic surface to complete the welding process. The point at which the stud 16 is released by the stud lifter 14 is referred to as the "drop point" and the precise moment at which the stud head 16a contacts the weld pool 18a during its descent is referred to hereinafter as the "plunge event".

Referring now to FIG. 2, a simplified preferred embodiment of the weld control circuit 24 in accordance with the present invention is shown. The circuit 24 generally includes a multiplier circuit 30, an amplifier circuit 32, a reference circuit 34, a temperature comparator 36, a "plunge" event comparator 38, and a latch 40. Optionally, an analog-to-digital converter 42 and a digital display 44 may be included to capture and display the weld zone temperature attained at the plunge event.

With further reference to FIG. 2, during the welding process the weld current signal across the current sensor is provided to an amplifier 46 and amplified to produce an output signal representative of the total current supplied by the power supply 12 to the weld zone. The output of amplifier 46 is provided to an inverting amplifier circuit 48 through a potentiometer 50. The potentiometer 50 acts as a cable resistance compensation resistor representing the total resistance of the welding cables coupled to the stud lifter 14 and the metallic surface 18 in FIG. 1. Accordingly, the potentiometer 50 is adjusted to represent the sum of the resistances 20 in FIG. 1.

With further reference to FIG. 2, the inverting amplifier 48 also receives a voltage signal directly from the power supply 12. The amplifier 48 thus produces an electrical signal at its output that is representative of the magnitude of the arc voltage 28 (FIG. 1), taking into account the losses introduced by the cable resistances 20. The multiplier circuit 30 then multiplies the current ("X") and voltage ("Y") signals received at its inputs to produce an output signal ("Z") at output 30a which is representative of the total power supplied by the power supply 12 to the weld zone. This total power signal from output 30a is provided to an amplifier circuit 32 through an input scaling resistor 52 which scales the signal by a desired factor. In the preferred embodiment, the value of resistor 52 is about 10 k ohms so that at 1.0 milliamp a 10-volts full scale signal is representative of a 100 kw input.

With further reference to FIG. 2, it is assumed that the temperature of the weld zone is approximately equal to the total power input, minus loss (e.g., heat sinking, radiation, etc.), all divided by the thermal mass or surface area of the weld zone. The present controller, therefore, derives a temperature signal for the weld zone using a special hybrid amplifier circuit 32. The amplifier circuit 32 generally includes an operational amplifier 55, a feedback capacitor 56, and a resistor 58. The value of resistor 58 represents the energy loss from heat sinking, radiation, etc., and the value of capacitor 56 is representative of the total thermal mass of the weld setup. It is an important advantage of the present invention that the selected capacitance of the feedback capacitor 56 includes the simulated mass of the specific stud being welded. Thus, the weld monitoring circuit 24 can be modified to take into account studs of varying sizes. The capacitance value of the capacitor 56 is determined by the following formula:

$$C_{mass} = \frac{-\text{Time}}{R_{loss}\left[\text{Log}_N\left(1-\frac{V_{inst}}{V_T}\right)\right]}$$

where "$V_{inst}$"=the voltage corresponding to a desired welding temperature of 3000° F.±200° F., which has been empirically determined as the optimum temperature range to be achieved during a weld (herein about 6 volts);

where "Time"=the empirically determined best weld time (e.g., 25 milliseconds for a given weld setup and 50 kw of energy);

where "$V_T$"=the voltage representing the maximum attainable welding temperature given the total energy input (e.g., 50 kw) and the attendant heat losses (e.g., 9000° F. which corresponds to a voltage signal of 18 volts); and where "$R_{loss}$" (resistor 58) is empirically determined, (e.g., about 30 k ohms).

Based upon the above assumptions and empirically derived information, the above formula may be used as follows:

$$C_{mass} = \frac{-.025}{30k\left[\text{Log}_N\left(1-\frac{6_v}{18_v}\right)\right]}$$

$$C_{mass} = \frac{-.025}{[30k\,\text{Log}_N(2/3)]} = 2.06\,\mu fd$$

Given the above noted assumptions, the voltage signal produced at the output 54 of amplifier circuit 32 is representative of the actual weld temperature of the weld zone during the welding process. Since this signal is generated in real time, the signal "tracks" the changing weld temperature to provide a real time indication of the actual weld temperature generated by the arc voltage 28 (FIG. 1) at the weld zone during the welding cycle.

With further reference to FIG. 2, the weld temperature signal at output 54 (which is at an inverted potential with respect to the signal at output 30a) is applied to the inverting input of the comparator 36 which compares this signal to a reference signal supplied to its non-inverting input. The reference signal is generated by a reference circuit 34 which includes a constant voltage source 61 and a pair of parallel-connected potentiometers 60 and 62 connected between the voltage source 61 and ground. The wiper of potentiometer 60 is connected to the non-inverting input of comparator 36 and the wiper of potentiometer 62 is connected to the inverting input of comparator 38, to be subsequently described.

Potentiometer 60 is set to provide a voltage signal to the non-inverting input of comparator 36 which is representative of the minimum desired temperature to be attained during the welding cycle to achieve a satisfactory weld. Accordingly, for the above-described example, an electrical signal of 5.6 volts, which represents a welding temperature of about 2800° F., is used. The temperature comparator 36 compares the actual weld temperature signal received at its inverting input with the reference temperature signal at its non-inverting input and generates a HI logic signal when the actual weld temperature signal exceeds the reference temperature signal. Thus, a logic HI level outputted from the temperature comparator 36 indicates that a weld temperature above 2800° F. has been attained during the welding cycle. The output from comparator 36 is supplied to the data (D) input of a D flip-flop 40 so that a HI signal is presented at the D input of flip-flop 40 when the temperature threshold is attained.

With continued reference to FIG. 2, to identify the plunge event (e.g., the time at which the head 16a of the stud 16 actually contacts the weld pool 18a during its descent) and capture the actual weld temperature at the plunge event, an additional comparator 38 is provided. Comparator 38 compares the weld voltage signal from the output of amplifier 48 with a reference signal received from the wiper of potentiometer 62. While in theory the plunge event is defined by the weld voltage falling to zero, in practice there may appear a series of brief drop-outs in the weld voltage signal as the stud head 16a approaches the weld pool 18a. This phenomenon, illustrated in the timing diagram shown in FIG. 4 at 70a, is due to the surface pitting and ejection of molten bits of metal that can pass between the stud head 16a and the weld pool 18a as the stud approaches the part surface 18. Additionally, the voltage signal from the welding power supply can be expected to include a substantial amount of noise.

To prevent these factors from causing an erroneous determination of the plunge event, the comparator 38 is designed to detect when the weld voltage signal drops below a threshold voltage that is above the background noise level. Accordingly, in the preferred embodiment, the potentiometer 62 is set to provide a threshold voltage signal of about 5 volts. Additionally, the output 38a from the comparator 38 is provided to an RC filter circuit 39 which is adapted to introduce a time delay of approximately 3 milliseconds to filter out the drop-outs in the voltage signal noted above. Consequently, in the preferred embodiment the plunge event is defined as the point in time when the "average" weld voltage signal drops below 5 volts.

When the filtered weld voltage signal falls below the 5-volt reference signal, comparator 38 generates a logic HI level signal at its output 38a which is supplied to the clock (C) input of D flip-flop Accordingly, if a HI signal is present at the data (D) input of flip-flop 40 when the clock input transitions from LO to HI, the Q output of flip-flop 40 will go HI, indicating a satisfactory weld. Conversely, if the data (D) input of flip-flop 40 is LO when the clock signal is received, the Q output will remain LO indicating an unsatisfactory weld.

Optionally, the actual weld temperature at the plunge event can be captured by an analog-to-digital converter 42 that is connected to receive the analog weld temperature signal produced at the output 54 of amplifier circuit 32. The analog-to-digital converter 42 is latched by the plunge event signal produced by comparator 38 and the converted digital signal from the analog-to-digital converter 42 provided to a visual display 44 to provide a visual indication of the actual weld temperature attained during the just-completed welding cycle. To reset the circuit to monitor the next weld cycle, a reset signal is provided to a solid-state switch 59 coupled across the feedback capacitor 56 to momentarily close the switch 59 and discharge the capacitor 56. The reset signal is also applied to the "reset" (R) input of the flip-flop 40 to reset the flip-flop.

Thus, the weld monitoring circuit 24 provides a real-time indication of whether the just-completed weld is satisfactory immediately upon completion of the welding cycle. Moreover, this is accomplished in a non-destructive manner so as not to alter or otherwise disturb the integrity of the weld.

Figure 4:
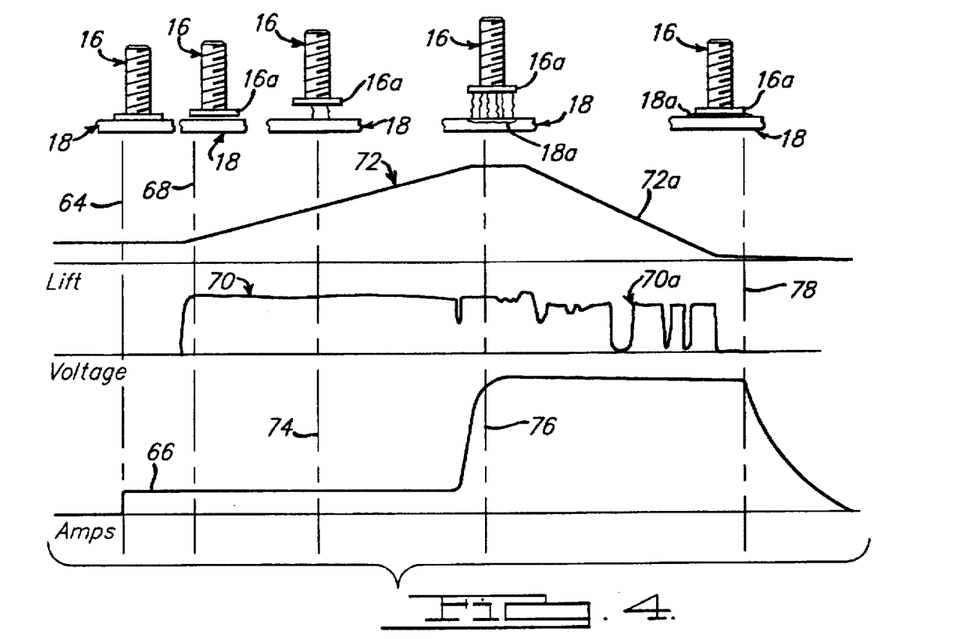
FIG. 4 is a graph of the relationship between the stud lift, the arc voltage and the welding current at the various points of travel of the stud relative to the surface to which it is being welded during the weld cycle.

Referring now to FIG. 4, the relationship between the arc voltage and current generated by the welding power supply 12 at the various steps of the welding process is shown. Initially, at point 64, when the stud 16 is in contact with the surface 18b of the workpiece 18 to be welded, the arc voltage 28 (FIG. 1) is essentially zero, and weld current is also at a relatively low level as indicated at 66. As the stud head 16a is lifted away from the surface 18b, the arc voltage rises rapidly to a relatively stable level 70 while the current 66 is kept at its initial low level 66, thereby creating a small initial arc, as indicated at point After the stud reaches its maximum lift, the welding current is increased significantly, as indicated at point 76, thereby generating the main arc. The stud 16 is held in the lifted position and the main arc maintained for a period of time sufficient to enable the formation of a weld pool 18a on the surface of the workpiece 18 when the stud 16 contacts the weld pool, taking into account the drop-time of the stud. At the plunge event indicated at point 78, weld current is turned off and decreases rapidly toward zero. With the weld current turned off, the weld zone rapidly cools thereby solidifying the weld pool 18a and completing the weld of the stud 16 to the workpiece 18.

Figure 5:
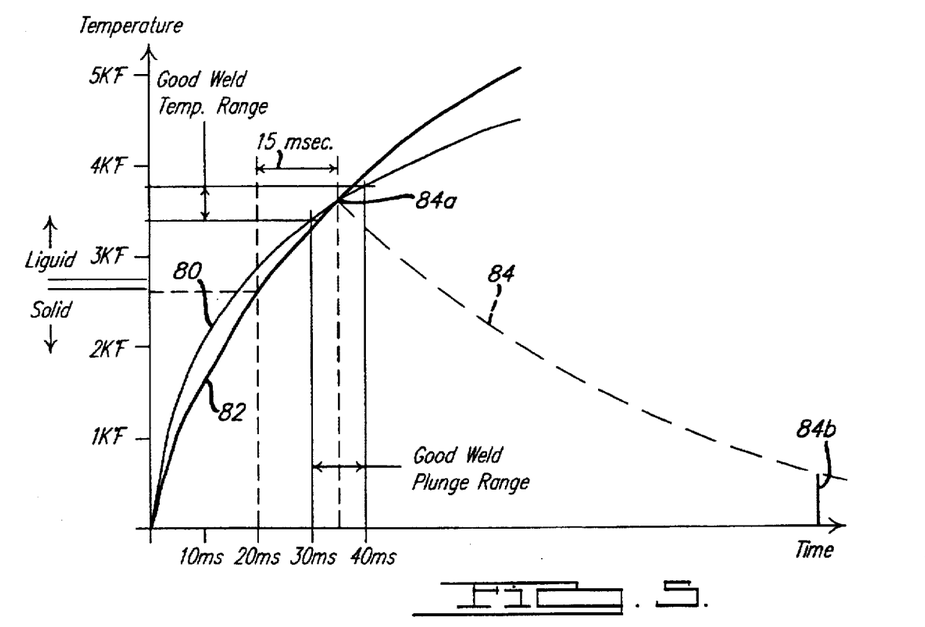
FIG. 5 is a graph of the actual temperature at the weld zone relative to the predicted welding heat temperature signal generated by the embodiments of the present invention.

Referring to FIG. 5, a graph of the actual temperature at the weld zone 80 is shown relative to the derived weld temperature signal 82 generated by the amplifier circuit 32 (FIG. 2). It can be seen that the derived weld temperature signal 82 closely tracks the actual temperature at the weld zone during the welding cycle. Dashed line 84 indicates approximately how the derived welding temperature signal drops after the plunge event occurs. The plunge event is represented by point 84a, and occurs approximately 35 milliseconds after energy is first applied to the weld zone. Point 84b indicates a reset signal being applied to switch 59 to discharge the capacitor 56. From FIG. 5, it can be seen that an optimum welding temperature range of about 34,000°–36,000° F. is achieved between about 30 ms–40 ms after energy is applied by the welding power supply 12 (FIG. 1). It will also be appreciated that the temperature at the weld zone continues to increase during the drop time of the stud 16, which in this example is about 12–14 milliseconds. Since the drop time is a known constant for a given weld setup, this time can be accounted for to ensure proper control of the total weld cycle time.

Referring now to FIG. 3, a welding control circuit 100 in accordance with an alternative preferred embodiment of the present invention is shown. The circuit 100 is similar to welding control circuit 24 shown in FIG. 2 with the added advantages of being able to accommodate either polarity of the power supply, to detect when the predicted welding temperature signal is outside of a predetermined temperature "window", and to provide independent output signals indicating a satisfactory weld or an unsatisfactory weld.

With further reference to FIG. 3, the circuit 100 comprises an integrator amplifier 102 which has its inputs coupled to the welding power supply 12 (FIG. 1). The output 102a of the integrator amplifier is applied to the "X" input of a multiplier 104. The inputs of a current amplifier 106 are connected across the current sensing resistor 22 and its output is coupled to the "Y" input of the multiplier 104. Resistors 108–122 are scaling resistors selected to produce a 10-volt output from the multiplier 104 for a 100 kw power input, which represents a "full scale" output.

The output of the multiplier 104 is coupled to the inverting input of an amplifier circuit 124 through a scaling resistor 126, which has a value of preferably about 10K ohms. The amplifier circuit 124 includes a feedback capacitor 128 and a feedback resistor 130 which are selected in a manner identical to that described in connection with capacitor 56 and resistor 58, respectively, of the embodiment shown in FIG. 2. The output 132 of the amplifier circuit 124 thus also represents the actual weld temperature at the weld zone during a weld cycle.

The weld temperature signal at output 132 of the amplifier 124 is applied to the inputs of a lower limit comparator 134 and an upper limit comparator 136 of a "temperature window" comparator circuit 138. Circuit 138 receives signals from a reference circuit 140 via potentiometers 142 and 144, where the electrical signal provided by the potentiometer 142 represents a minimum predetermined lower temperature limit, for example 2800° F., and the potentiometer 144 represents a maximum predetermined upper temperature limit, for example 3200° F. Comparators 134 and 136 compare the weld temperature signal produced by the amplifier circuit 124 against these upper and lower limit signals, and if the predicted weld temperature signal falls within this temperature "window", each of the comparators 134 and 136 generates a logic HI output signal. The logic HI signals are applied to respective inputs of an AND-gate 146 which generates a logic HI output signal when both comparator outputs are HI. Thus, a logic HI output from the AND-gate 146 indicates that the weld temperature signal is within the predetermined temperature window.

An absolute value comparator circuit 150 is provided to detect the plunge event regardless of the polarity of the power supply. In particular, comparator circuit 150 receives a first reference signal from the potentiometer 148 on the inverting input of a first comparator 152. The electrical signal representing the arc voltage from integrator amplifier 102 is applied to the non-inverting input of the first comparator 152 and also to an inverting input of a second comparator 154. The non-inverting input of the second comparator 154 is coupled to a potentiometer 156 which provides a second reference voltage against which the output of the amplifier 102 is compared. When either of the comparators 152 and 154 generates a logic LO output signal, thus indicating that the welding arc voltage has fallen to less than a minimum absolute value representing the plunge event, the output of AND-gate 158 also goes LO. The output from AND-gate 158 is provided through an RC time delay circuit 160 and an inverter 162 to the clock (C) inputs of a pair of D-flip-flops 164 and 166. The time delay circuit 160 is preferably configured to provide a time delay of about 3 milliseconds to filter out the drop-outs in the arc voltage noted above and described in connection with FIG. 4.

The logic signal from the output of AND-gate 146 is provided directly to the data (D) input of flip-flop 164 and through an inverter 170 to the data (D) input of flip-flop 166. The reset inputs of each of the flip-flops 164 and 166 are commonly coupled through an inverter 172 to the interface circuit 26 (FIG. 1) to allow the flip-flops 164 and 166 to be reset after each welding cycle. The Q output of flip-flop 164 is applied through a driver amplifier 174 to a visual indicator such as an LED 176 for indicating a satisfactory weld. The Q output of the flip-flop 166 is similarly coupled through a driver amplifier 178 to a visual display element 180 for indicating an unsatisfactory weld.

Accordingly, if at the moment of the plunge event the weld temperature signal at output 132 of the amplifier circuit 124 is within the predetermined temperature window (e.g., between approximately 2800° F. and 3200° F.), the output from the AND-gate 146 will be HI, thereby causing the Q output of flip-flop 164 to go HI and produce a visual indication at indicator 176 that a satisfactory weld has taken place. If, however, the output from AND-gate 146 is a logic LO at the plunge event, the Q output of flip-flop 166 will go HI to energize the indicator 180 and provide an indication that an unsatisfactory weld has occurred. The welding control circuit 100 thus provides the benefits of monitoring the welding temperature at the weld zone in real time and providing a signal indicating a satisfactory weld only if the welding temperature at the weld zone during the weld cycle reaches a point within a predetermined temperature window at the time the plunge event occurs. In this manner, there is no ambiguity as to whether a satisfactory or an unsatisfactory weld has occurred.

Turning now to FIG. 6, a further alternative embodiment of a weld control circuit 200 according to the present invention is shown. The weld control circuit 200 illustrated in FIG. 6 is substantially identical to the controller 24 shown in FIG. 2 with the addition of circuitry to dynamically control the drop time of the stud and hence the total time period of the weld process.

For most weld setups, the period of time from the release of the stud 16 by the stud lifter 14 to the actual plunge event is approximately 12–15 milliseconds. For very small studs the total ideal weld time may be only 15–20 msec. long. Consequently, for these applications, the stud must be dropped as soon as or almost immediately after the main arc has commenced. Therefore, dynamic control of the drop time is not practical for weld setups requiring very short weld times. However, for stud welding applications involving larger sized studs required longer weld times, such as in the range of 30–40 msec., the dynamic control of the drop time of the stud using the weld controller according to the present invention becomes possible.

Returning to the graph shown in FIG. 5, the exemplary weld setup depicted presents an ideal weld time of approximately 35 msec. Accordingly, if it is assumed that the plunge process takes 15 msec. from the drop point to the plunge event, it is apparent that the derived temperature curve 82 can be used to determine the desired weld temperature at the drop point. In other words, because the temperature of the weld zone continues to rise during the period of stud descent, by controlling the drop point of the stud in accordance with the derived temperature of the weld zone, the controller can effectively predict the weld temperature at the plunge event and thereby dynamically control the quality of the weld.

Returning to the exemplary weld setup graphed in FIG. 5, and assuming a stud descent period of 15 msec., the desired weld zone temperature at the drop point is approximately 2500° F. Accordingly, to dynamically control the drop point of the stud and hence the total weld time of the weld process, the present weld controller can be used to monitor the temperature of the weld zone and produce a release signal that is supplied to the solenoid stud lifter when the temperature signal reaches 2500° F.

Returning to the circuit diagram in FIG. 6, the dynamic weld controller 200 includes an additional comparator 90 that is adapted to receive at its inverting input the weld temperature signal from output 54, and at its non-inverting input a drop point reference signal 86 from the wiper terminal of a third potentiometer 88 in the reference circuit 34. In the above-described example, the potentiometer 88 is set to provide a drop point reference signal 86 of 5.0 volts which corresponds to a weld temperature of 2500° F. Accordingly, when the weld temperature signal at output 54 exceeds 5.0 volts (i.e., 2500° F.), the comparator 90 produces an output signal that is supplied to the solenoid stud lifter 14 to trigger release of the stud 16. In this manner, the total time of the weld process is dynamically controlled to ensure that the weld temperature at the plunge event is within the desired ideal range, thereby greatly improving weld repeatability and quality.

Thus, it will be appreciated that each of the welding control circuit embodiments 24, 100, and 200 provide a real time temperature model of what happens during the weld cycle. Moreover, the three principal parameters of input energy, loss energy, and the thermal mass at the weld zone can be adjusted to accommodate different operational parameters such as different sizes of welding studs, the loss experienced during the welding process, and the total power supplied during the welding process by the welding power supply 12. By simply varying the values of the capacitors 56 and 128 and the resistors 58 and 130, each of the welding control circuits 24, 100, and 200 can be modified to account for the welding of larger or smaller studs. Additionally, it will be appreciated that the use of capacitors 56 and 128 also obviates the need for optical coupling devices such as photoelectric transistors which are more susceptible to electrical noise generated during the welding process. As such, the control circuits 24 and 100 are significantly less likely to be affected by electrical noise and much less likely to produce erroneous weld quality indications.

Further, it will be appreciated that the various embodiments of the weld control circuit according to the present invention can also be modeled in software using a programmed microcontroller to implement the concepts described herein.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A weld control circuit for controlling a weld process joining a first metallic member to a second metallic member at a weld zone, comprising:

a power supply for supplying electrical power to said weld zone;

a first circuit for producing an electrical temperature signal related to the temperature of said weld zone during the weld process at the instant said first metallic member is brought into contact with said second metallic member; and a second circuit responsive to said temperature signal for producing an output signal indicative of the quality of the weld formed by the weld process.

2. The weld control circuit of claim 1 wherein said first circuit means produces said temperature signal in accordance with a current signal related to the total current supplied by the power supply to the weld zone and a voltage signal related to the voltage applied across the weld zone.

3. The weld control circuit of claim 2 wherein said first circuit produces said temperature signal by determining the total energy supplied to the weld zone in accordance with said current and voltage signals, subtracting therefrom a heat loss factor, and dividing the result by a mass factor related to the mass of the first and second metallic members in the weld zone.

4. The weld control circuit of claim 3 wherein said first circuit includes an amplifier circuit having an input and an output, said amplifier circuit receiving a signal at its input related to the total energy supplied to the weld zone, a feedback resistor connected between the input and the output of the amplifier circuit and having a value related to said heat loss factor, and a capacitor connected between the input and the output of the amplifier in parallel with said resistor and having a value related to said mass factor, whereby the signal produced at the output of the amplifier circuit comprises said temperature signal.

5. The weld control circuit of claim 1 wherein said second circuit produces said output signal indicative of weld quality in accordance with the value of said temperature signal at a predetermined point in time relative to the weld process.

6. The weld control circuit of claim 5 wherein the weld process is a stud welding process whereby a stud is initially raised above a metallic surface, an arc is generated between the stud and the metallic surface by the application of electrical power from the power supply, and the stud is then lowered into a liquified metallic pool that forms on the metallic surface from the heat generated by the applied electrical power.

7. The weld control process of claim 6 wherein said predetermined point in time comprises the moment when the stud contacts the metallic pool ("plunge event").

8. The weld control circuit of claim 7 further including fourth circuit means for displaying the value of said temperature signal at the plunge event.

9. The weld control circuit of claim 7 wherein said second circuit includes a first comparator circuit for comparing said temperature signal with a first reference signal and producing an output signal indicative of a good weld when the value of said temperature signal exceeds said first reference signal.

10. The weld control circuit of claim 9 wherein said second circuit further includes a second comparator circuit for comparing said temperature signal with a second reference signal greater than said first reference signal, and producing an output signal indicative of a good weld when the value of said temperature signal exceeds said first reference signal but is less than said second reference signal.

11. The weld control circuit of claim 6 further including an electro-mechanical device for controlling the raising and lowering of the stud.

12. An weld control circuit of claim 11 further including third circuit means responsive to said temperature signal for producing a drop signal that is provided to said electro-mechanical device to control the lowering of the stud.

13. A process for controlling a weld process for joining a first metallic member to a second metallic member at a weld zone, comprising the steps of:

a) applying electrical power to the weld zone, b) producing a temperature signal related to the temperature of the weld zone at the instant the first metallic member is brought into contact with the second metallic member during the weld process, and c) evaluating the quality of the weld formed by the weld process in accordance with the value of said temperature signal.

14. The process of claim 13 wherein said step b) includes the steps of producing a current signal related to the current applied to the weld zone, producing a voltage signal related to the voltage applied across the weld zone, and producing said temperature signal in accordance with said current and voltage signals.

15. The method of claim 14 wherein said temperature signal is produced by determining the total energy applied to the weld zone in accordance with said current and voltage signals, subtracting therefrom a heat loss factor, and dividing the result by a mass factor related to the mass of the first and second metallic members in the weld zone.

16. The process of claim 13 wherein said evaluation step is performed in accordance with the value of said temperature signal at a predetermined point in time relative to the weld process.

17. The method of claim 16 wherein the weld process is a stud welding process whereby a stud is initially raised above a metallic surface, an arc is generated between the stud and the metallic surface by the application of electrical power from the power supply, and the stud is then lowered into a liquified metallic pool that forms on the metallic surface from the heat generated by the applied electrical power.

18. The method of claim 17 wherein said predetermined point in time comprises the moment when the stud contacts the metallic pool ("plunge event").

19. The method of claim 17 further including the step of controlling the point in time during the weld process when the stud is lowered in accordance with said temperature signal.

20. The method of controlling a stud welding process wherein a stud is initially raised above a metallic surface, an arc is generated between the stud and the metallic surface by the application of electrical power from a power supply through the stud to the metallic surface, and the stud is then lowered into a metallic pool that forms on the metallic surface from the heat generated by the applied electrical power, comprising the steps of:

a) monitoring the current applied to the stud and producing a current signal related thereto;

b) monitoring the voltage applied across the stud and metallic surface and producing a voltage signal related thereto;

c) producing from said current and voltage signals a temperature signal related to the temperature of the metallic surface at the instant said stud is lowered into contact with the metallic pool during the welding process; and d) controlling the point in time during the welding process when the stud is lowered in accordance with said temperature signal.

21. The method of claim 20 wherein said step d) includes the step of comparing said temperature signal with a predetermined reference signal related to a desired temperature value.

22. The method of claim 21 wherein said step c) includes the steps of determining from said current and voltage signals the total applied electrical energy, subtracting therefrom a predetermined loss factor, and dividing the result by a predetermined mass factor related to the mass of the stud.

23. The method of claim 22 further including the step of evaluating the quality of the weld formed by the weld process in accordance with the value of said temperature signal at the point in time when the stud contacts the metallic pool.

24. A weld control circuit for controlling a weld process joining a first metallic member to a second metallic member at a weld zone, comprising:

a power supply for supplying electrical power to said weld zone;

a first circuit for producing an electrical temperature signal related to the temperature of said weld zone during the weld process; and a second circuit responsive to said temperature signal for producing an output signal indicative of the quality of the weld formed by the weld process;

wherein said first circuit means produces said temperature signal in accordance with a current signal related to the total current supplied by the power supply to the weld zone and a voltage signal related to the voltage applied across the weld zone;

wherein said first circuit produces said temperature signal by determining the total power supplied to the weld zone in accordance with said current and voltage signals, subtracting therefrom a heat loss factor, and dividing the result by a mass factor related to the mass of the first and second metallic members in the weld zone.

25. A process for controlling a weld process for joining a first metallic member to a second metallic member at a weld zone, comprising the steps of:

a) applying electrical power to the weld zone, b) producing a temperature signal related to the temperature of the weld zone during the weld process, and c) evaluating the quality of the weld formed by the weld process in accordance with the value of said temperature signal;

wherein said step b) includes the steps of producing a current signal related to the current applied to the weld zone, producing a voltage signal related to the voltage applied across the weld zone, and producing said temperature signal in accordance with said current and voltage signals;

wherein said temperature signal is produced by determining the total power applied to the weld zone in accordance with said current and voltage signals, subtracting therefrom a heat loss factor, and dividing the result by a mass factor related to the mass of the first and second metallic members in the weld zone.

* * * * *